UNITED STATES PATENT OFFICE.

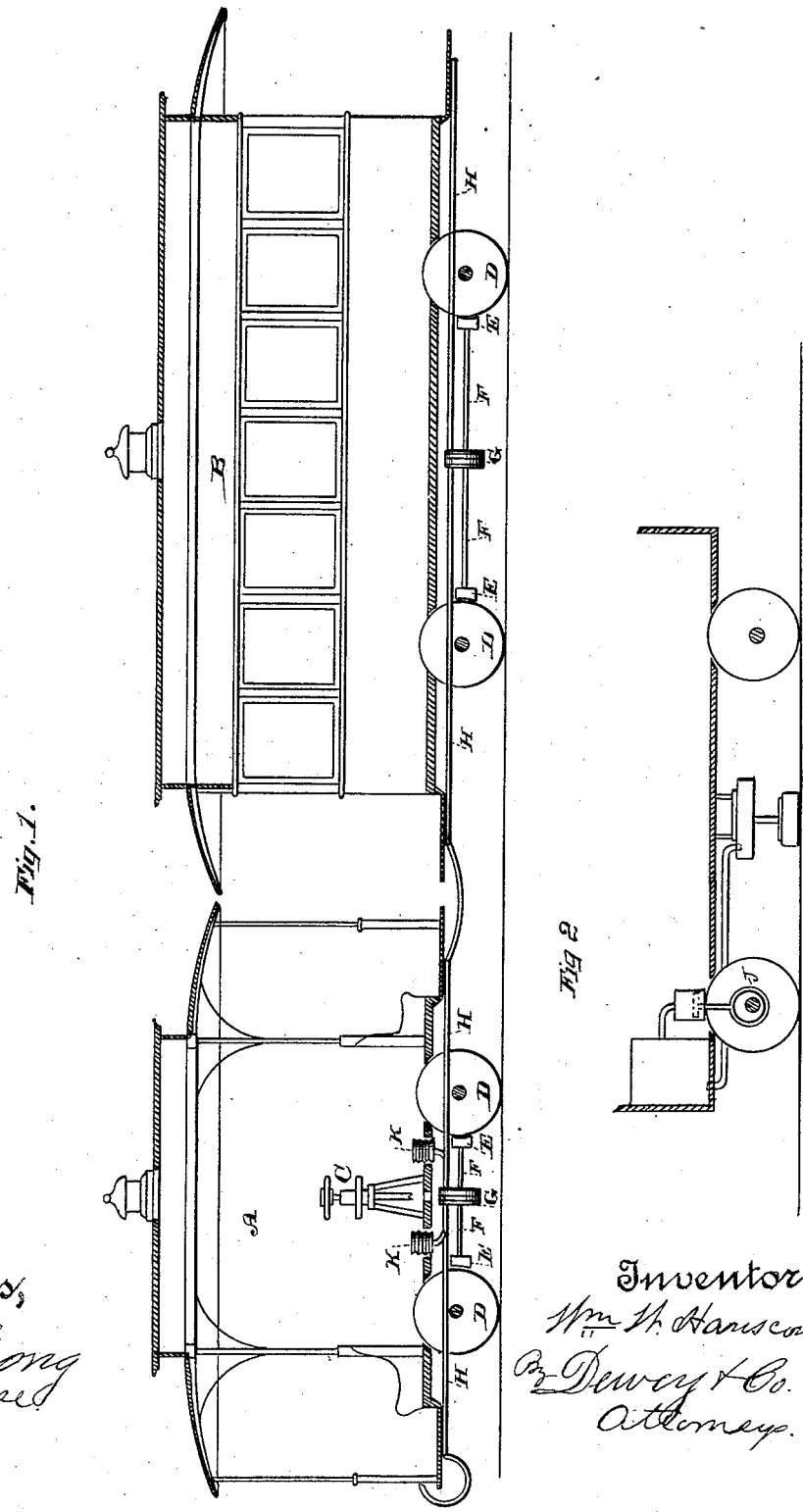

WILLIAM W. HANSCOM, OF SAN FRANCISCO, CALIFORNIA.

AIR-BRAKE FOR CARS OF CABLE RAILROADS.

SPECIFICATION forming part of Letters Patent No. 265,671, dated October 10, 1882.

Application filed May 9, 1882. (No model.)

*To all whom it may concern:*

Be it known that I, WILLIAM W. HANSCOM, of the city and county of San Francisco, State of California, have invented an Improvement in Air-Brakes for the Cars of Cable Railroads; and I hereby declare the following to be a full, clear, and exact description thereof.

My invention relates to a means for effectually controlling the cars and dummies which are used upon street cable railroads; and it consists of a system of brakes acting against the wheels and operated by the compression of air, the brakes of the dummy and the following cars all being under the control of the driver.

Referring to the accompanying drawings for a more complete explanation of my invention, Figure 1 is a side elevation, showing one application of my invention. Fig. 2 shows method of pumping air into receiver.

A is the dummy or grip-car of a cable railway, and B a following car, which is drawn by the dummy.

C represents any suitable mechanism for operating the grip, by which connection is made with the cable, and D are the wheels of the cars.

E are the brakes, which are shown in the present case supported between the wheels D, and having rods or bars F extending toward each other, so that power may be applied from the center to force each brake against its wheel. The inner ends of the rods F are fixed to disks forming the backs of air-cushions G, which are fixed midway between the wheels. These air-cushions are connected with a pressure device or tank by pipes H, so that air-pressure may be supplied whenever desired. The air-cushions are of such a diameter that with the available pressure they will exert a sufficient power upon the brakes to arrest the motion of the car at will.

Various devices may be employed to produce the desired pressure, one of which is to store compressed air in tanks or receivers on the cars, the supply being renewed at certain stations, and another is to fix a pump, I, upon the car, which may be operated by a crank or eccentric, J. I prefer, however, to simplify the means as much as possible; and in order to do this I have shown one or more air-compressing devices, K, which may be in the form of cylinders with pistons, or of bellows having springs by which they will be kept extended. These bellows are conveniently placed so that the driver may at any time place his foot upon one or the other and by his weight force air through the pipes H into the cushions G, and these, acting upon the brakes, force them against the wheels, so as to check or stop the car.

All the cars are provided with similar air cushions and brakes, and are connected by pipes H with the compressors, so that the brakes may all be operated simultaneously by the driver at one movement, his hands being left free to attend to the grip-levers or other mechanism.

This device is especially important upon cable railways on which heavy gradients must be passed over, and in which, also, there is more danger of accidents in front of the dummy. By its use the driver has complete control of both the dummy and the following cars without the assistance of the conductor.

It will be manifest that by a slight variation of the mechanism the brakes E could be applied upon the outsides of the wheels and the connection with the operating cylinders or cushions made by tension-rods; or by placing the cylinders or cushions so as to act vertically they may be applied to brakes which press upon the track, as shown in Fig. 2.

Having thus described my invention, what I claim as new, and desire to secure by Letters Patent, is—

The brakes E, mounted so as to be moved outwardly against the wheels D by means of the cushions G and rods F, in combination with the air-compressing cylinder or bellows K and connecting-pipe H, substantially as herein described.

In witness whereof I hereunto set my hand.

WILLIAM W. HANSCOM.

Witnesses:
S. H. NOURSE,
G. W. EMERSON.